United States Patent

O'Connor

[15] 3,668,361
[45] June 6, 1972

[54] STRUCTURE FOR AND METHOD OF ELECTRO EROSION MACHINING

[72] Inventor: Thomas J. O'Connor, 100 Morgan Road, Ann Arbor, Mich. 48106

[22] Filed: Apr. 30, 1970

[21] Appl. No.: 33,217

[52] U.S. Cl. .................................... 219/69 C, 219/131
[51] Int. Cl. .................................................. B23k 9/16
[58] Field of Search .................. 219/69 C, 69 V, 131, 69 P

[56] References Cited

UNITED STATES PATENTS

| 2,951,930 | 9/1960 | McKechnie | 219/69 C |
| 3,154,719 | 10/1964 | Sommeria | 315/163 |
| 3,335,317 | 8/1967 | Sciaky | 315/171 |
| 3,485,989 | 12/1969 | Sennowitz | 219/69 P |
| 3,419,754 | 12/1968 | Schlerholt | 315/227 |

Primary Examiner—J. V. Truhe
Assistant Examiner—Gale R. Peterson
Attorney—Whittemore, Hulbert and Belknap

[57] ABSTRACT

A high voltage, low current electric signal is placed across the electrode and workpiece in an electro erosion machining circuit in accordance with the disclosure to provide improved machining. The high voltage, low current signal may be continuous or pulsed and if pulsed, it may be initiated by intermittent low voltage, high current electro erosion machining pulses or independent therefrom. The high voltage, low current signals, if pulsed, may also be initiated prior to, at the same time as or subsequent to the low voltage, high current electro machining pulses and may be of the same or opposite polarity. If the high voltage, low current signal is pulsed, the frequency and pulse width may be varied. A capacitor may be selectively placed across the electrode and workpiece during electro erosion machining in conjunction with the high voltage, low current signal to further improve the machining characteristics of the low voltage, high current electro erosion machining signal.

5 Claims, 2 Drawing Figures

PATENTED JUN 6 1972
3,668,361
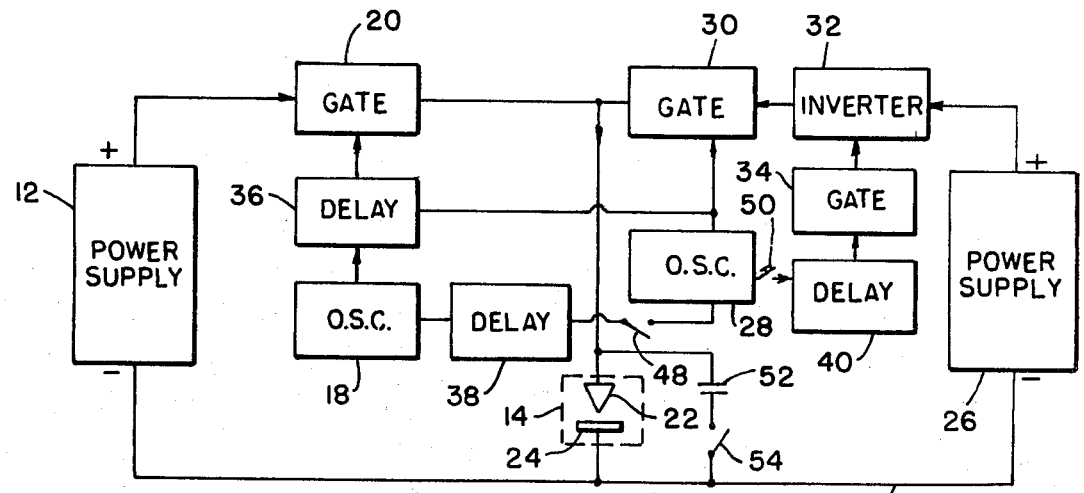
FIG.1
FIG.2
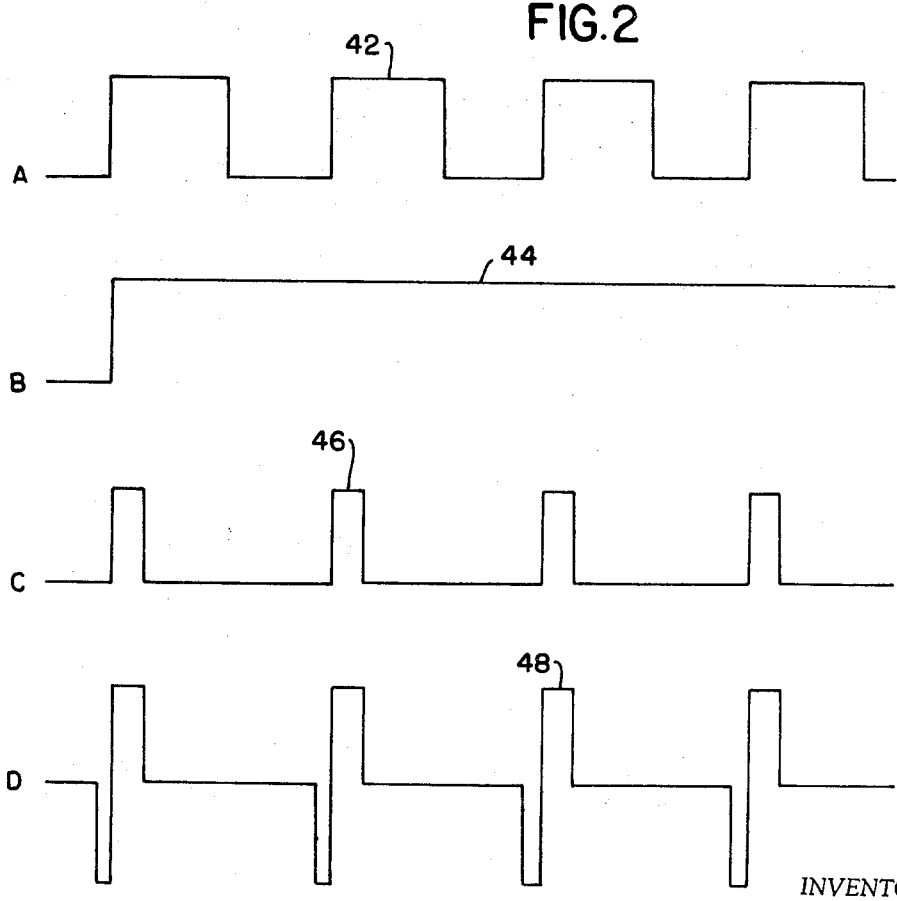
INVENTOR.
THOMAS J. O'CONNOR
BY Whittemore, Hulbert
& Belknap
ATTORNEYS

STRUCTURE FOR AND METHOD OF ELECTRO EROSION MACHINING

BACKGROUND OF THE INVENTION

1. FIELD OF THE INVENTION

The invention relates to electro erosion machining and refers more specifically to structure for and a method of electrical discharge machining by a low voltage, high current intermittent elector erosion machining signal in conjunction with a high voltage, low current signal applied during electro erosion machining across the electrode and workpiece in the machining circuit and a capacitor selectively placed across the electrode and workpiece to provide improved electro erosion machining characteristics particularly in conjunction with electro erosion of small-diameter holes.

2. DESCRIPTION OF THE PRIOR ART

Electro erosion machining has generally been accomplished by applying a low voltage, high current electric energy signal across an electrode and workpiece. In the case of electro chemical machining, the electrode and workpiece are immersed in an electrolyte and the electric signal is usually continuous, while in the case of electrical discharge machining, the electrode and workpiece are immersed in a di-electric and the low voltage, high current signal is generally pulsed to produce a spark between the electrode and workpiece.

In the past, resistance capacitance circuits have sometimes provided the intermittent discharge for electrical discharge machining by charging of a capacitor from a power source and subsequent discharging of the capacitor across the electrode and workpiece. More recently, electrical discharge machining has been accomplished by power supplies pulsed by oscillators serving to open and close a gate circuit in series with the power supply, workpiece and electrode.

The prior structures have produced exceptionally fine machining on large surface dies and in intricate designs wherein flushing has been possible. However, difficulty has been encountered in electrically machining small-diameter blind holes since flushing of the fluid in which the electrode and workpiece are immersed through the gap between the electrode and workpiece has been substantially impossible. In machining such holes, small machined particles collect in the holes and electrodes become coated within the holes causing a substantial reduction in machining speed as the depth of the holes increases.

SUMMARY OF THE INVENTION

In accordance with the invention, a high voltage, low current electric signal is placed across the electrode and workpiece in an electro erosion circuit in conjunction with the low voltage, high current electro erosion machining signal. The high voltage, low current signal has been found to appreciably improve the electro erosion characteristics of electro erosion equipment machining small openings and is beneficial in other electro erosion machining applications. In particular, the speed of cutting is greatly reduced by the inclusion of the high voltage, low current signal across the electrode and workpiece. In addition, electro erosion machining may be further improved by selectively placing a capacitor across the electrode and workpiece in conjunction with the high voltage, low current signal during electro erosion machining in accordance with the invention.

BRIEF DESCRIPTION OF THE DRAWINGS

FIG. 1 is a block diagram of structure constructed in accordance with the invention for performing electro erosion machining in accordance with the method of the invention.

FIGS. 2 A, B, C and D are wave forms useful in explaining the method of electro erosion machining in accordance with the invention practiced with the structure illustrated in FIG. 1.

DESCRIPTION OF THE PREFERRED EMBODIMENT

As shown best in FIG. 1, electrical discharge machining is accomplished by means of a machine tool power supply 12 in a machine tool mechanical section 14 as set forth in U.S. Pat. No. 3,222,494 and the publication referenced therein under the control of the circuit 16 of the invention. The usual control circuit for the power supply 12 will include the oscillator 18 and the gate 20.

Thus, under normal operation an electrode 22 and a workpiece 24 secured to a machine tool mechanical section 14 and positioned in spaced apart relation immersed in a di-electric are connected, as shown, in series with gate 20 and the power supply 12. Accordingly, as the gate 20 is opened by pulses from the oscillator 18 through delay 36, relatively low voltage, high current signals are applied between the electrode 22 and workpiece 24 to produce sparks therebetween and thus electro erosion machining.

In accordance with the present invention, a separate power supply 26 is provided in conjunction with a separate oscillator 28, a separate gate 30, an inverter 32, a third gate 34 and time delays 36, 38 and 40, connected as shown in FIG. 1.

The separate power supply 26 which provides a high voltage, low current signal is connected in series with the gate 30 through the inverter 32 across the electrode 22 and workpiece 24. The gate 30, as shown, is under control of the oscillator 28. Thus, during electro erosion machining, a high voltage, low current electric signal may be applied across the electrode 22 and workpiece 24 in accordance with the pulsing of the oscillator 28. Thus, during electro erosion machining, a high voltage, low current electric signal may be applied across the electrode 22 and workpiece 24 in accordance with the pulsing of the oscillator 28.

Power supply 26, as shown, is separate from the power supply 12. However, it will be readily understood that power supplies 12 and 26 may be combined and produce both the low voltage, high current signals as indicated from the power supply 12 and the high voltage, low current signals from the power supply 26. In this connection, the power supply 26 may provide, for example, an 85-volt direct current signal at 5 amperes which on being pulsed through the gate 20 will provide a square wave voltage signal, as shown by wave shape 42 in FIG. 2A at the frequency of the oscillator 18. In accordance with many current electrical discharge machine power supplies, the oscillator 18 may be controlled to vary the frequency and the pulse width of the pulses indicated in FIG. 2 by determining the "on" time and "off" time of the gate 20.

Similarly, the oscillator 28 may be controlled in "on" time and "off" time to, for example, provide a continuous direct current signal at up to 500 volts at 40 milliamperes from the power supply 26 through the gate 30 by maintaining the gate 30 always open due to a continuous "on" time for oscillator 28, as shown best by wave shape 44 in FIG. 2B. Alternatively, the oscillator 28 may pulse to provide a wave shape 46 as indicated in FIG. 2C which show a relatively short "on" time and long "off" time determined by the oscillator 28 opening and closing the gate 30 which periodically connects the power supply 26 across the electrode 22 and workpiece 24.

While it will be understood that the oscillator 28 may be independent, that is, may oscillate independently of the oscillator 18, when the switch 48 is closed the pulses of high voltage, low current electrical energy through the gate 30 may be synchronized with the low voltage, high current pulses from the power supply 12 through the gate 20 due to control of the oscillator 28 by the oscillator 18.

When the oscillator 28 is controlled by the oscillator 18, initiation of the pulses of high voltage, low current electrical energy from the power supply 26 may be synchronized with the pulses of low voltage, high current from the power supply 12 across the electrode 22 and workpiece 24 if the delays 36 and 38 are not active; that is, if they are set for a minimum or zero time delay. Such a condition is shown by wave shape 46 in FIG. 2C.

If it is desired to provide a pulse of high voltage, low current prior to initiation of a pulse of low voltage, high current, the time delay 36 is set for the desired delay in initiation of the low voltage, high current pulse. Similarly, if it is desired to delay the initiation of the high voltage, low current pulse of electrical energy until after the initiation of the low voltage, high current pulse of electrical energy across the electrode and workpiece, the time delay 38 is set to provide the required delay. In the wave shape 48 illustrated in FIG. 2D, the high voltage, low current signal is initiated prior to the low voltage, high current electro erosion signal illustrated in FIG. 2A.

Due to the inclusion of the inverter 32, gate 34 and time delay 40 in the structure illustrated in FIG. 1, the high voltage, low current energy may be pulsed across the electrode and workpiece at either positive or negative polarity. As shown, if a negative polarity is desired for the high voltage, low current signal, the switch 50 is closed to provide a signal initiated with the signal from the oscillator 28 which may be delayed through the delay 40 and which is subsequently passed through the gate 34 to gate the inverter 32 "on." Without being gated "on," the inverter 32 provides a straight-through path for the high voltage, low current signal from the power supply 26 to the gate 30.

Thus, as an example and particularly referring to the wave shape 48 in FIG. 2D, the delay provided by the time delay 36 is longer than the delay provided by the time delay 38, the gate 34 is set to provide a signal to the inverter 32 for a period equal to the delay in opening of the gate 20 provided by the time delay 36 over the delay provided by the time delay 38. Thus, on closing of the switch 50 when the oscillator 28 provides a pulse prior to opening of the gate 20 to open the gate 30, the initial signal from the power supply 26 through the gate 30 will be inverted through the inverter 32 due to a signal passing through the delay 40 and the gate 34. When the delay in opening of the gate 20 caused by the time delay 36 expires to let the gate 20 open to provide the pulse of low voltage, high current electrical energy, the gate 34 which may be, for example, a unistable multivibrator is closed so that the inverter is no longer energized. The remaining pulse of electrical energy through the gate 30 from the power supply 26 will be a positive pulse of relatively high voltage and low current.

Thus, in accordance with the wave shape 48 of FIG. 2D, a substantial negative voltage is applied across the electrode and workpiece in FIG. 1 prior to initiation of the low voltage, high current pulse from the power supply 12, as illustrated by the wave shape 42 in FIG. 2A, and the low voltage, high current pulse from the power supply 12 is concurrent with the positive portion of the high voltage, low current signal illustrated in the wave shape 48 of FIG. 2D.

The wave shape of FIG. 2D has been found to be particularly efficient in cutting small-diameter openings in that the negative potential initially applied between the electrode and workpiece apparently tends to remove debris collected on the electrode in the machining gap between the electrode and workpiece. With the debris removed from the electrode, the positive portion of the high voltage, low current signal initiates a spark between the electrode and workpiece sooner than the low voltage, high current signal from the power supply 12 would. After the spark is initiated between the electrode and workpiece, the signal from the power supply 26 is overridden by the low voltage, high current signal from the power supply 12 and may therefore be turned off.

The particular polarity and duration of the pulses of both the low voltage, high current and high voltage, low current, together with the time of initiation thereof to produce optimum machining, will vary in accordance with the material of the workpiece and the electrodes used, as will be readily understood by those in the electro erosion machining art. In particular, machining of tungsten with solid copper and tungsten carbide electrodes having negative polarity and solid brass electrodes having positive polarity and of 13/1000ths diameter has been greatly improved by impressing wave shapes 44, 46 and 48 across the electrodes and workpieces in accordance with the circuit of FIG. 1, in addition to the usual electro erosion machining pulses in accordance with wave shape 42.

Cutting of small-diameter blind holes by electro erosion machining is additionally aided in conjunction with the application of a high voltage, low current signal between the electrode and workpiece by inclusion of the capacitor 52 between the electrode and workpiece. The capacitor 52 may be selectively placed across the electrode and workpiece by the switch 54.

While one embodiment of the present invention has been considered in detail, it will be understood that other embodiments and modifications thereof are contemplated by the inventor. It is the intention to include all such embodiments and modifications of the invention as are defined by the appended claims within the scope of the invention.

What I claim as my invention is:

1. Electrical discharge machining structure comprising a first direct current power supply of low voltage and high current, an electrode and workpiece in spaced apart relation to form a spark gap connected across the first power supply, first gate means connected between the first power supply and one of the electrode and workpiece for gating electrical energy from the first power supply to the electrode and workpiece, a first oscillator connected to the first gate means for opening and closing the first gate means in accordance with the frequency of oscillation of the first oscillator, a second supply of direct current power of high voltage and low current connected across the electrode and workpiece, a second gate positioned between the second power supply and one of the electrode and workpiece for gating electrical energy from the second power supply to the electrode and workpiece, a second oscillator connected to the second gate for opening and closing the second gate in accordance with the frequency of oscillation of the second oscillator and a time delay connected between the first oscillator and first gate.

2. Structure as set forth in claim 1 and further including means connecting the first time delay to the second oscillator for controlling the first time delay in response to the operation of the second oscillator.

3. Electrical discharge machining structure comprising a first direct current power supply of low voltage and high current, an electrode and workpiece in spaced apart relation to form a spark gap connected across the first power supply, first gate means connected between the first power supply and one of the electrode and workpiece for gating electrical energy from the first power supply to the electrode and workpiece, a first oscillator connected to the first gate means for opening and closing the first gate means in accordance with the frequency of oscillation of the first oscillator, a second supply of direct current power of high voltage and low current connected across the electrode and workpiece, a second gate positioned between the second power supply and one of the electrode and workpiece for gating electrical energy from the second power supply to the electrode and workpiece, a second oscillator connected to the second gate for opening and closing the second gate in accordance with the frequency of oscillation of the second oscillator and a time delay connected between the first oscillator and second oscillator for controlling the second oscillator in response to the operation of the first oscillator.

4. Electrical discharge machining structure comprising a first direct current power supply of low voltage and high current, an electrode and workpiece in spaced apart relation to form a spark gap connected across the first power supply, first gate means connected between the first power supply and one of the electrode and workpiece for gating electrical energy from the first power supply to the electrode and workpiece, a first oscillator connected to the first gate means for opening and closing the first gate means in accordance with the frequency of oscillation of the first oscillator, a second supply of direct current power of high voltage and low current connected across the electrode and workpiece, a second gate positioned between the second power supply and one of the electrode and workpiece for gating electrical energy from the second power supply to the electrode and workpiece, a second oscillator connected to the second gate for opening and closing the second gate in accordance with the frequency of oscillation of the second oscillator and an inverter positioned between the second power supply and the second gate whereby the power applied between the electrode and workpiece from the first and second power supplies may be of opposite potential.

5. Structure as set forth in claim 4 and further including a third gate circuit for actuating the inverter in accordance with a signal received thereby, a time delay connected to the third gate circuit and means for initiating the time delay in response to the second oscillator.

* * * * *